US008724662B2

(12) United States Patent
Toner et al.

(10) Patent No.: US 8,724,662 B2
(45) Date of Patent: May 13, 2014

(54) WIRELESS COMMUNICATION PROTOCOL FOR LOW POWER RECEIVERS

(75) Inventors: Adam Toner, Jacksonville, FL (US); Scott Robert Humphreys, Greensboro, NC (US); Randall Braxton Pugh, St. Johns, FL (US); Daniel B. Otts, Fruit Cove, FL (US); William Chester Neeley, Melbourne, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 207 days.

(21) Appl. No.: 13/531,874

(22) Filed: Jun. 25, 2012

(65) Prior Publication Data

US 2013/0343248 A1  Dec. 26, 2013

(51) Int. Cl.
  *H04J 3/06* (2006.01)
(52) U.S. Cl.
  USPC .......................................... 370/503
(58) Field of Classification Search
  CPC ........... G02C 7/04; G02C 7/083; G02C 7/02; G02C 7/101; G02C 7/08; G02C 7/086; G02C 9/00; B29D 11/00826; A61F 9/023; G06F 3/103; G06F 3/005; G06F 3/011; G06F 3/017; G06F 1/163; G02B 27/0093; G02B 27/107; G02B 2027/0178; G02B 2027/014; G06Q 30/02; H04L 27/2675; H04L 27/2613; H04L 27/2662; H04W 56/00
  USPC ................................. 370/503–520
  See application file for complete search history.

(56) References Cited

U.S. PATENT DOCUMENTS

| | | | | |
|---|---|---|---|---|
| 5,177,740 | A * | 1/1993 | Toy et al. | 370/337 |
| 6,169,751 | B1 * | 1/2001 | Shirakata et al. | 370/480 |
| 6,356,555 | B1 * | 3/2002 | Rakib et al. | 370/441 |
| 7,454,219 | B2 * | 11/2008 | Mege et al. | 455/503 |
| 7,488,294 | B2 * | 2/2009 | Torch | 600/558 |
| 7,697,750 | B2 * | 4/2010 | Simmons | 382/154 |
| 7,963,652 | B2 * | 6/2011 | Vertegaal et al. | 351/205 |
| 8,363,635 | B2 * | 1/2013 | Liu | 370/350 |
| 8,488,895 | B2 * | 7/2013 | Muller et al. | 382/254 |
| 2005/0041208 | A1 * | 2/2005 | Winterbotham | 351/203 |
| 2011/0298794 | A1 * | 12/2011 | Freedman | 345/419 |
| 2011/0316847 | A1 * | 12/2011 | Cheng | 345/419 |
| 2012/0140051 | A1 * | 6/2012 | Tabor | 348/56 |
| 2012/0143080 | A1 * | 6/2012 | Greenberg et al. | 600/554 |
| 2012/0212484 | A1 * | 8/2012 | Haddick et al. | 345/419 |
| 2013/0027526 | A1 * | 1/2013 | Mao | 348/56 |
| 2013/0127980 | A1 * | 5/2013 | Haddick et al. | 348/14.08 |

OTHER PUBLICATIONS

CCIR Recommendation 584-1, 1986. online: http://www.catr.cn/radar/itur/201007/P020100714514807366164.pdf.
"Going Beyond the HD-6409 Data Sheet," Technical Brief TB463.0, Intersil Corportation, Jul. 10, 2006. online: http://www.intersil.com/data/tb/tb463.pdf.

(Continued)

*Primary Examiner* — Thai Hoang
(74) *Attorney, Agent, or Firm* — Carl J. Evens

(57) ABSTRACT

A wireless protocol for a communication system is set forth herein which may be utilized for communication between a transmitter and a receiver over any type of communication channel. The wireless communication protocol provides for the reduction of receiver active or on time which in turn lowers power consumption. The wireless communication protocol enables the complexity and receiver size to be reduced. The methodology employed in the protocol utilizes a unique message frame in conjunction with repeated transmission and periodic receiver searching.

24 Claims, 2 Drawing Sheets

(56) References Cited

OTHER PUBLICATIONS

Gold, R., "Optimal Binary Sequences for Spread Spectrum Multiplexing," Transactions on Information Theory, IEEE, Oct. 1967, pp. 619-621.

"Gold Sequence Generator," Communications System Toolbox documentation for MATLAB release R2011b, The MathWorks corporation 2012. online: http://www.mathworks.com/help/toolbox/comm/ref/goldsequencegenerator.html.

"Manchester Coding Basics," Application Note 9164A, Atmel Corporation, 2009. online: http://atmel.com/dyn/resources/prod_documents/doc9164.pdf.

"Manchester Decoding using PSoC," Application Note AN2358, Cypress Semiconductor, Inc., Oct. 15, 2007. online: http://www.eetasia.com/STATIC/PDF/200805/EEOL_2008MAY23_EMS_AN_03.pdf?SOURCES=DOWNLOAD.

Mitra, A., "On Pseudo-Random and Orthogonal Binary Spreading Sequences," International Journal of Information and Communication Engineering 4:6 2008. online: http://www.waset.org/journals/ijice/v4/v4-6-58.pdf.

Sklar, B., Digital Communications, PTR Prentice Hall, New Jersey, 1988, pp. 4-11.

Telecom New Zealand Limited, "Technical Requirements for Permission to Connect Radio Paging Receivers," 1997. online: http://www.telepermit.co.nz/PTC251.pdf.

\* cited by examiner

WIRELESS COMMUNICATION PROTOCOL FOR LOW POWER RECEIVERS

BACKGROUND OF THE INVENTION

1. Field of the Invention

The present invention relates to powered ophthalmic lenses, and more particularly to wireless communication protocols for use in conjunction with powered ophthalmic lenses or other devices that are extremely small and energy limited.

2. Discussion of the Related Art

As electronic devices continue to be miniaturized, it is becoming increasingly more likely to create wearable or embeddable microelectronic devices for a variety of uses. Such uses may include monitoring aspects of body chemistry, administering controlled dosages of medications or therapeutic agents via various mechanisms, including automatically, in response to measurements, or in response to external control signals, and augmenting the performance of organs or tissues. Examples of such devices include glucose infusion pumps, pacemakers, defibrillators, ventricular assist devices and neurostimulators. A new, particularly useful field of application is in ophthalmic wearable lenses and contact lenses. For example, a wearable lens may incorporate a lens assembly having an electronically adjustable focus to augment or enhance performance of the eye. In another example, either with or without adjustable focus, a wearable contact lens may incorporate electronic sensors to detect concentrations of particular chemicals in the precorneal (tear) film. The use of embedded electronics in a lens assembly introduces a potential requirement for communication with the electronics, for a method of powering and/or re-energizing the electronics, for interconnecting the electronics, for internal and external sensing and/or monitoring, and for control of the electronics and the overall function of the lens.

The human eye has the ability to discern millions of colors, the ability to adjust easily to shifting light conditions, and transmit signals or information to the brain at a rate exceeding that of a high speed internet connection. Lenses, such as contact lenses and intraocular lenses, currently are utilized to correct vision defects such as myopia, hyperopia and astigmatism. However, properly designed lenses incorporating additional components may be utilized to enhance vision as well as to correct vision defects.

Conventional contact lenses are polymeric structures with specific shapes to correct various vision problems as briefly set forth above. To achieve enhanced functionality, various circuits and components have to be integrated into these polymeric structures. For example, control circuits, microprocessors, communication devices, power supplies, sensors, actuators, light emitting diodes, and miniature antennas may be integrated into contact lenses via custom built optoelectronic components to not only correct vision, but to enhance vision as well as provide additional functionality as is explained herein. Electronic and/or powered contract lenses may be designed to provide enhanced vision via zoom-in and zoom-out capabilities or just simply modifying the refractive capabilities of the lenses. Electronic and/or powered contact lenses may be designed to enhance color and resolution, to display textural information, to translate speech into captions in real time, to offer visual cues from a navigation system, to provide image processing and internet access. The lenses may be designed to allow the wearer to see in low light conditions. The properly designed electronics and/or arrangement of electronics on lenses may allow for projecting an image onto the retina, for example, without a variable focus optic lens, provide novelty image displays and even provide wakeup alerts. Alternately, or in addition to any of these functions or similar functions, the contact lenses may incorporate components for the noninvasive monitoring of the wearer's biomarkers and health indicators. For example, sensors built into the lenses may allow a diabetic patient to keep tabs on blood sugar levels by analyzing components of the tear film without the need for drawing blood. In addition, an appropriately configured lens may incorporate sensors for monitoring cholesterol, sodium and potassium levels as well as other biological markers. This coupled with a wireless data transmitter could allow a physician to have almost immediate access to a patient's blood chemistry without the need for the patient to waste time getting to a laboratory and having blood drawn. In addition, sensors built into the lenses may be utilized to detect light incident on the eye to compensate for ambient light conditions or for use in determining blink patterns.

The proper combination of devices could yield potentially unlimited functionality; however, there are a number of difficulties associated with the incorporation of extra components on a piece of optical grade polymer. In general, it is difficult to manufacture such components directly on the lens for a number of reasons, as well as mounting and interconnecting planar devices on a non-planar surface. It is also difficult to manufacture to scale. The components to be placed on or in the lens need to be miniaturized and integrated onto just 1.5 square centimeters of a transparent polymer while protecting the components from the liquid environment on the eye. It is also difficult to make a contact lens comfortable and safe for the wearer with the added thickness of additional components.

Communication with a powered ophthalmic device offers a number of unique challenges. Wireless communication protocols provide a structure for transmitting data or information in an organized way to facilitate efficient operation of either or both the transmitter and receiver. Aspects of the data transmission determined by the protocol comprise the method of transmission, for example, modulating a carrier signal, the modulation format, the structure of the data messages, and additional data sent to facilitate synchronization of the receiver to the transmitter as well as error correction at the receiver.

Prior art protocols for radio frequency (RF) or infrared (IR) communication are commonly used for data communication utilizing digital modulation formats such as amplitude-shift keying (ASK), on-off keying (OOK), phase-shift keying (PSK) or frequency-shift keying (FSK) as are well known in the relevant art. These protocols may be utilized for communication between fixed transmitters and receivers as well as between mobile or portable transmitters or receivers.

In particular, portable transmitters and receivers impose design constraints on power consumption due to the limited capacity of the batteries utilized to power the transmit and receive circuitry. In order to reduce power consumption, prior art protocols allow for intermittent transmission and reception by sending data from the transmitter only when needed rather than by requiring the continuous transmission of the carrier signal. The receiver may conserve power by periodically turning on (waking-up or strobing) and searching for a transmission.

Prior art protocols fall into two categories; namely, asynchronous and synchronous. In asynchronous protocols, the receiver searches for a transmission and then synchronizes to the transmitted data stream to decode the transmitted message. In synchronous protocols, the receiver maintains a time reference that is synchronized to the transmitter time reference, often after a successful asynchronous reception.

Accordingly, certain prior art protocols provide for asynchronous operation initially followed by synchronous operation for later reception intervals.

In asynchronous operation, in order to properly receive the data, the receiver must understand where the start of the data transmission begins. In prior art protocols, the transmitter first sends a long preamble usually comprising a simple one and zero data pattern followed by a synchronization word and then the data. The preamble is at least as long as the receiver wake-up or strobe interval to ensure that the receiver will always see the preamble. The Post Office Code Standardization Advisory Group (POCSAG) protocol is an example of this type of asynchronous protocol. It is utilized to transmit information or data to pagers.

Prior art protocols thereby reduce both receiver and transmitter power consumption by this method of intermittent transmission and reception. These protocols are particularly effective in reducing transmitter power consumption which is important for battery powered hand held remote controls and small wireless sensor transceivers.

However, in the case of extremely small and/or energy limited receivers, the prior art communication protocols have a number of drawbacks. For example, when a preamble is detected, the receiver must remain on for, on average, over half the length of the preamble or strobe interval to wait for the transmit synchronization word and data. For many systems, the length of the data transmission may be significantly shorter than the strobe interval which means the wait period represents significant overhead. Also, small batteries tend to have high series resistance, and the receiver current may be high enough to induce a significant voltage drop at the battery. To compensate, additional decoupling capacitance may be added to provide a charge reservoir to reduce the voltage drop, with a resulting tradeoff of an increased cost, increased complexity, and higher area and volume receiver. Finally, very low power systems tend to implement very simple modulation methods such as ASK or OOK to reduce the complexity and power consumption of the receiver. These amplitude modulation detectors are likely to falsely detect a one-zero preamble pattern from noise on the transmission channel, leading to longer receiver "on" times when no transmission is actually occurring.

Synchronous protocols provide some advantages over asynchronous protocols because the long preamble of an asynchronous protocol need not be decoded by the receiver. Once synchronized, the receiver can turn on or wakeup just prior to the transmit synchronization word thereby reducing the receiver on time. However, in order to have long sleep or off periods, the receiver and transmitter must retain accurate time bases with little or no drift over time and with little changes over environmental conditions. This typically requires the use of a ceramic resonator or quartz crystal-based oscillator which increases the size, cost and current consumption of the receiver.

Accordingly, there exists a need for a wireless communication protocol that enables the use of extremely low power consumption and extremely small size or volume receivers by minimizing the required receiver on-times.

SUMMARY OF THE INVENTION

The wireless communication protocol for low power receivers in accordance with the present invention overcomes the limitations associated with current communication protocols as briefly described above.

In accordance with one aspect, the present invention is directed to a method for wireless data communication. The method comprises the steps of assembling a message frame, the message frame including a synchronization word, an address word and a data word, repeatedly transmitting the message frame from a wireless transmitter for a minimum transmission duration, at a receiver, periodically searching for a predetermined synchronization word in the transmitted message frame, the duration of each synchronization search being at least as long as the length of the message frame plus the length of one synchronization word minus one symbol, at the receiver, determining if a transmitted message frame includes a synchronization word that corresponds to the predetermined synchronization word, and at the receiver, decoding the transmitted message frame only if the predetermined synchronization word is found.

In accordance with another aspect, the present invention is directed to a method for wireless data communication. The method comprises the steps of assembling a message frame, the message frame including a synchronization word and a data word, repeatedly transmitting the message frame from a wireless transmitter for a minimum transmission duration, at a receiver, periodically searching for a predetermined synchronization word in the transmitted message frame, the duration of each synchronization search being at least as long as the length of the message frame plus the length of one synchronization word minus one symbol, at the receiver, determining if a transmitted message frame includes a synchronization word that corresponds to the predetermined synchronization word, and at the receiver, decoding the transmitted message frame only if the predetermined synchronization word is found.

In accordance with yet another aspect, the present invention is directed to a wireless communication system. The system comprises a transmitter, including transmitter circuitry and encoding circuitry, the encoding circuitry being configured to assemble a message frame having at least a synchronization word and a data word, and the transmitter being configured to repeatedly transmit the message frame for a minimum transmission duration, a transmission channel, and a receiver, including receiver circuitry and decoding circuitry, the decoding circuitry being configured for periodically searching for a predetermined synchronization word in the transmitted message frame, the duration of each synchronization search being at least as long as the length of the message frame plus the length of the synchronization word minus one symbol, wherein the period of searching for a predetermined synchronization word in the transmitted message frame is less than the minimum transmission duration.

In accordance with still another aspect, the present invention is directed to a wireless transmitter. The wireless transmitter comprises encoding circuitry, the encoding circuitry being configured to assemble a message frame having at least a synchronization word and a data word, and transmitter circuitry, the transmitter being configured to repeatedly transmit the message frame for a minimum transmission duration over a transmission channel.

In accordance with still another aspect, the present invention is directed to a wireless receiver. The wireless receiver comprises decoding circuitry, the decoding circuitry being configured for periodically searching for a predetermined synchronization word in a transmitted message frame, the duration of each synchronization search being at least as long as the length of the message frame plus the length of the synchronization word minus one symbol, wherein the period of searching for a predetermined synchronization word in the transmitted message frame is less than the minimum transmission duration, and receiving circuitry for receiving a transmitted message from a transmission channel.

A digital communication system comprises a number of elements which when implemented, may take on any number of forms. The digital communication system generally comprises an information source, a source encoder, a channel encoder, a digital modulator, a channel, a digital demodulator, a channel decoder and a source decoder.

The information source may comprise any device that generates information and/or data that is required by another device or system. The source may be analog or digital. If the source is analog, its output is converted into a digital signal comprising a binary string. The source encoder implements a process of efficiently converting the signal from the source into a sequence of binary digits. The information from the source encoder is then passed into a channel encoder where redundancy is introduced into the binary information sequence. This redundancy may be utilized at the receiver to overcome the effects of noise, interference and the like encountered on the channel. The binary sequence is then passed to a digital modulator which in turn converts the sequence into analog electrical signals for transmission over the channel. Essentially, the digital modulator maps the binary sequences into signal waveforms or symbols. Each symbol may represent the value of one or more bits. The digital modulator may modulate a phase, frequency or amplitude of a high frequency carrier signal appropriate for transmission over or through the channel. The channel is the medium through which the waveforms travel, and the channel may introduce interference or other corruption of the waveforms. In the case of the wireless communication system, the channel is the atmosphere. The digital demodulator receives the channel-corrupted waveform, processes it and reduces the waveform to a sequence of numbers that represent, as nearly as possible, the transmitted data symbols. The channel decoder reconstructs the original information sequence from knowledge of the code utilized by the channel encoder and the redundancy in the received data. The source decoder decodes the sequence from knowledge of the encoding algorithm, wherein the output thereof is representative of the source information signal.

It is important to note that the above described elements may be realized in hardware, in software or in a combination of hardware and software. In addition, the communication channel may comprise any type of channel, including wired and wireless. In wireless, the channel may be configured for high frequency electromagnetic signals, low frequency electromagnetic signals, visible light signals and infrared light signals.

The wireless protocol for a communication system in accordance with the present invention may be utilized for communication between a transmitter and a receiver over any type of communication channel. The wireless communication protocol provide for the reduction of receiver active or on time which in turn lowers power consumption, reduces battery voltage drop and/or reduces component size and cost. The wireless communication protocol also enables the complexity and size of the receiver to be reduced. The methodology employed in the protocol utilizes a unique message frame in conjunction with repeated transmissions and periodic receiver searching.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE PREFERRED EMBODIMENTS

Figure 1:
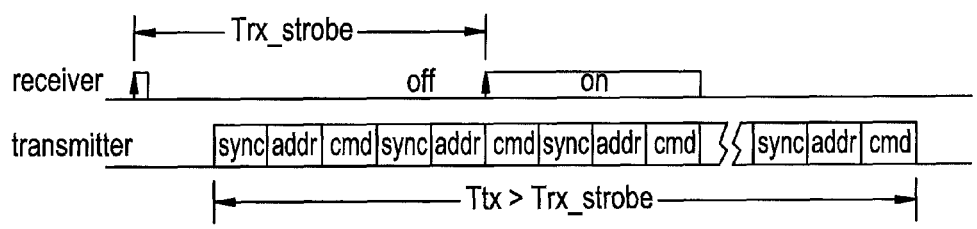
FIG. 1 illustrates an exemplary frame structure in accordance with the present invention.

The present invention is directed to a wireless communication protocol which requires less power to implement and thereby allows associated receivers to have a reduced energy requirement or capacity and smaller area and volume requirements compared to prior art systems. This communication protocol is particularly advantageous for extremely small, portable devices such as those that may be utilized in medical devices including powered ophthalmic lenses. While the communication product described herein may be utilized with any transmitter and receiving system, it may be particularly advantageous to extremely small systems with limited power resources. Accordingly, the description of the wireless communication protocol will be described, where required, with respect to powered ophthalmic lenses which may as described subsequently comprise a wireless communication system.

Conventional contact lenses are polymeric structures with specific shapes to correct various vision problems as briefly set forth above. To achieve enhanced functionality, various circuits and components have to be integrated into these polymeric structures. For example, control circuits, microprocessors, communication devices, power supplies, sensors, actuators, light emitting diodes, and miniature antennas may be integrated into contact lenses via custom built optoelectronic components to not only correct vision, but to enhance vision as well as provide additional functionality as is explained herein. Electronic and/or powered contract lenses may be designed to provide enhanced vision via zoom-in and zoom-out capabilities or just simply modifying the refractive capabilities of the lenses. Electronic and/or powered contact lenses may be designed to enhance color and resolution, to display textural information, to translate speech into captions in real time, to offer visual cues from a navigation system, to provide image processing and internet access. The lenses may be designed to allow the wearer to see in low light conditions. The properly designed electronics and/or arrangement of electronics on lenses may allow for projecting an image onto the retina, for example, without a variable focus optic lens, provide novelty image displays and even provide wakeup alerts. Alternately, or in addition to any of these functions or similar functions, the contact lenses may incorporate components for the noninvasive monitoring of the wearer's biomarkers and health indicators. For example, sensors built into the lenses may allow a diabetic patient to keep tabs on blood sugar levels by analyzing components of the tear film without the need for drawing blood. In addition, an appropriately configured lens may incorporate sensors for monitoring cholesterol, sodium and potassium levels as well as other biological markers. This coupled with a wireless data transmitter could allow a physician to have almost immediate access to a patient's blood chemistry without the need for the patient to waste time getting to a laboratory and having blood drawn. In addition, sensors built into the lenses may be utilized to detect light incident on the eye to compensate for ambient light conditions or for use in determining blink patterns. Given the functionality described herein, even the least complex powered lens or ophthalmic device will have a need for and comprise a communication system. This communication system is preferably small and utilizes minimal power.

Accordingly, the communication protocol of the present invention may be utilized in combination with a contact lens comprising an electronic system which actuates a variable-focus optic. The electronic system includes one or more batteries or other power sources, power management circuitry, one or more sensors, clock generation circuitry, control algorithms and circuitry, lens driver circuitry and communications circuitry. The communications circuitry may comprise circuitry for both the transmission and reception of data/information and hence the need for a wireless communications protocol.

A digital communication system comprises a number of basic elements which when physically implemented may take on any number of forms. The information source may comprise any device that generates information and/or data that is required by another device or system. The source may be analog or digital. If the source is analog, its output is converted into a digital signal comprising a binary string. In any digital communication system, it is desirable to utilize as few binary digits as possible to represent the original signal. Source encoding is a process of efficiently converting the signal into a sequence of binary digits. Accordingly, a source encoder is utilized to perform this function. The information from the source encoder is passed into a channel encoder where redundancy is introduced into the binary information sequence. This redundancy may be utilized at the receiver to overcome the effects of noise, interference and the like encountered on the channel. The binary sequence is then passed to a digital modulator which in turn converts the sequence into electric signals for transmission over the channel. In other words, the digital modulator maps the binary sequences into signal waveforms or symbols. Each symbol may represent the value of one or more bits. The digital modulator may modulate a phase, frequency or amplitude of a high frequency carrier signal appropriate for transmission through the channel. The channel is a medium through which the waveforms travel and the channel may introduce interference or other corruption of the waveforms. In the case of a wireless system, the channel is the atmosphere. A digital demodulator receives the channel corrupted waveform, processes it and reduces the waveform to a sequence of numbers that represent, as nearly as possible, the transmitted data symbols. A channel decoder reconstructs the original information sequence form the knowledge of the code utilized by the channel encoder and the redundancy in the received data. A source decoder decodes the sequence from a knowledge of the encoding algorithm, wherein the output thereof is representative of the source information signal. Details of each function are given subsequently. It is important to note that the above described elements may be realized in hardware, software and/or both hardware and software. In addition, the communication channel may comprise a high frequency electromagnetic propagation channel, a low frequency electromagnetic coupling, a visible light electromagnetic propagation channel and an infrared light electromagnetic propagation channel.

Frame synchronization is a process through which incoming frame alignment signals, for example, distinctive symbol or bit sequences, are identified and distinguished from data, thereby permitting the data within a stream of framed data to be extracted for decoding and/or retransmission. Referring to FIG. 1, there is illustrated a frame structure in accordance with the present invention. The frame structure provides a message frame comprising a transmit synchronization word, sync, and a data word. In some exemplary embodiments, the data word may comprise a device address of the intended receiver, addr, and a command word, cmd, to provide an instruction or information to the receiver. In some exemplary embodiments, the data word may comprise a register address of an interested register to modify in the receiver and a new register data value. Rather than a long preamble during which the receiver must wait for the transmitted data, the sync, addr and cmd words are sent repeatedly for the full frame interval. The receiver may then be on for only the time required to detect the sync word and decode the address and command. Since the sync, addr and cmd words are typically much shorter than the receiver strobe interval, $T_{rx\text{-}strobe}$, the receiver on time and average power are greatly reduced relative to prior art asynchronous communication protocols. As illustrated, the transmit time $T_{tx}$ is set to be greater than the receiver strobe interval $T_{rx\_strobe}$.

Because a receiver may begin decoding transmitted data at any given point, the synchronization word, sync, must be uniquely detected. Prior art communication protocols employ Block Codes, i.e. error correcting codes that encode data in blocks, with code words, e.g., allowable words for sync, addr and cmd or other message data, that are not unique when shifted and/or rotated left or right. The use of this type coding would lead to false detection of the synchronization word when it is offset within the frame.

In accordance with an exemplary embodiment of the present invention, the synchronization words may be selected to be an Orthogonal Cyclic Code, such as a Gold code or Gold code sequence, which is unique regardless of the shift or starting point for decoding relative to other Gold code sequences of the same length. In this exemplary embodiment, the address and command words are also selected or limited such that the message frame does not match the synchronization word at any shift. In an alternate exemplary embodiment, the allowable list or code book of address and command words may be selected to minimize the correlation of address and command words to the synchronization word, as may be characterized by the cross-correlation or the Hamming Distance as is known in the relevant art. In yet another alternate exemplary embodiment, the address and command word set may be selected only from a set of Gold codes or Gold sequences to minimize the cross-correlation to the synchronization word.

The generation of Gold codes or sequences is known in the relevant art. Gold codes or sequences are generated from two pseudo-random sequence generators having preferred polynomials. Preferred polynomials are those that lead to maximal length sequences (m-sequences, length=$2^m-1$), and that have cross correlation values of $\{1, t, -t\}$, where $t=2^{(m+1)/2}+1$ or $2^{(m+2)/2}+1$ for odd or even m. Gold codes are available only in certain lengths, which constrains their use somewhat for short code words. It is important to note that while Gold codes may have the best cross-correlation properties, other code words may be utilized which have reasonably high distances to the Gold codes. Accordingly, in another exemplary embodiment, these other code words with good (low) cross-correlation may be utilized for device addresses and commands while the Gold codes may be utilized as synchronization words.

In yet another alternate exemplary embodiment, the synchronization, address and command words may be selected as set forth in the process described below. In the first step of the exemplary process, an address length, LA, is selected or chosen to provide more than a desired number of distinct addresses for a particular application. For example, fifteen (15) million addresses may be desired for a particular application. Accordingly, for fifteen (15) million addresses, the required address length is twenty-four (24) bits because twenty-four bits yields over sixteen (16) million unique addresses ($2^{24}$=16,777,216) and twenty-three (23) bits yields only over eight (8) million addresses. In the second step of the exemplary process, a command length, LC, is selected or chosen to provide a desired number of distinct commands. For example, eight (8) commands may be desired for the particular application. Accordingly, for eight (8) commands, the required command length is three (3) bits because three bits yield eight (8) commands ($2^3$=8). In the third step of the exemplary process, the synchronization word is selected from a set of Gold codes with a length close to that of the combined address and command word length. For a Gold code, the word length is $2^m-1$; accordingly, for m=1, the word length is one (1) bit, for m=2, the word length is three (3) bits, for m=3, the word length is seven (7) bits, for m=4, the word length is fifteen (15) bits and for m=5, the word length is thirty-one (31) bits. The longer the synchronization word, the lower the number of synchronization+address+command combinations that will contain a match to the synchronization word at some offset. Accordingly, any address from the list of allowable addresses that leads to matches at some offsets is removed; however, this selection is a tradeoff between overall message length, and corresponding receiver on time, versus the total number of remaining addresses. In this example, a synchronization word length of fifteen (15) bits is good enough to retain most of the possible addresses as is explained in more detail subsequently. Also for the synchronization word, if one is utilizing a non-return to zone (NRZ) symbol format, it is generally advantageous if the average value of the symbols is a value of one-half. This can help with determining where the threshold value should be on a comparator in a signal processing portion of the receiver. In embodiments utilizing Manchester coding, which provides an average value of 0.5 for each symbol, this is less of a concern. Accordingly, in this example, the fifteen (15) bit synchronization word is selected to be 100110010101101, which comprises eight 1's and seven 0's for an average value of 0.533. In the fourth and final step of the exemplary process, a useable set of addresses is determined by constructing all possible sequences of synchronization word, address word and command word, determining the possible sample sequences of length LS formed by taking subsets of the synchronization+address+command+synchronization sequence minus one symbol starting at each possible offset, and removing those addresses that have a strong correlation, for example, a perfect match or small Hamming Distance, to the synchronization word at some offsets. In this example which utilizes a twenty-four (24) bit address length, a three (3) bit command length, and a fifteen (15) bits Gold code of 100110010101101, implementing the search of step four of the exemplary process results in 69,632 addresses out of the 16,777,216 possible addresses that yield sequences which match the synchronization word at some offsets. Thus, only a relatively small subset of the possible addresses must be removed from the set of possible addresses.

It is important to note that those of ordinary skill in the relevant art will recognize that the synchronization word may be chosen or selected in any suitable manner, including utilizing a random number generator and address and command words chosen to avoid a strong correlation. It is also important to note that the length of the synchronization word, the address word and the command word may be selected to suit the needs of a particular system. For example, very short word lengths may be used in a system that only requires a small number of receivers to minimize receiver on time. Similarly, much longer synchronization address and command words may be chosen to support a much larger number of users or commands.

Modulation is the technique of adding the message signal to some form of carrier signal. In other words, modulation involves varying one or more properties of a high frequency, periodic waveform, the carrier signal, with a modulating signal that comprises the data or information to be transmitted. There are analog modulation methods, including amplitude modulation, frequency modulation and phase modulation, and there are digital modulation methods, including phase-shift keying, frequency-shift keying, amplitude-shift keying and quadrature amplitude modulation. As the present invention is a digital-based system, digital modulation techniques as set forth herein may be utilized. Some exemplary embodiments of the present invention may utilize on-off keying to modulate the amplitude of a carrier signal. The carrier signal may be a radio frequency electromagnetic signal or a visible or infrared light signal, such as that emitted from a light-emitting diode. The modulated signal is transmitted, detected and demodulated at the other end of the communication channel; namely, the receiver. Essentially, modulation techniques deal with how the data signal is incorporated onto a carrier signal, but do not deal with how the data signal is created from the data or information to be transmitted. Coding is a technique through which a message or data signal is constructed from the data or information to be communicated. Coding techniques include NRZ coding, BiPhase coding and Manchester coding. Coding may be considered an additional function of the digital modulator.

Manchester coding is a common data coding technique. Manchester coding provides for adding the data rate clock to the data or information to be utilized on the receiving end of the communication channel. Manchester encoding is the process of adding the correct transitions to the message signal in relation to the data or information that is to be transmitted over the communication channel.

For the following discussion, a number of conventional definitions are utilized. A "symbol" is one unit of information sent over a communication channel. The value of the symbol is determined, in the current invention, by the voltages on the communication channel at different times. The "symbol time" is simply the duration of the symbol. The "symbol rate" is the reciprocal of the symbol time, expressed in symbols per second. Each symbol may represent one bit of the binary data stream or a multi-bit value. For Manchester encoded symbols, there are two possible voltage levels, high or low, and each symbol comprises one voltage level for the first half of the symbol time and the other voltage level for the second half of the symbol time. In accordance with the present invention, the convention utilized is that the voltage level in the first half symbol time defines the value of the symbol. This is explained in detail subsequently. Manchester data always has a mid-symbol transition even if the symbol values are constant for a long time or if they are changing. In addition, there might not be transitions in the signal levels from the end of one symbol to the beginning of the next, for example, a 0 to a 1 symbol will have a high voltage level at the end of the 0 and start of the 1 symbol, but there is always a mid-symbol transition. A "sample" is a captured or recorded value from an instant in time or from a small window in time. In accordance with the present invention, the incoming signal is periodically sampled and from the value of each sample, the value of the current symbol is determined. The rate of periodic sampling is the "sampling rate". For Manchester decoding, the incoming signal is "oversampled," meaning that a sampling rate that is greater than the symbol rate by at least a factor of 2× is utilized. In the present invention, 8× oversampling is utilized. Because the symbol value is determined by the voltage level in the first half symbol time, one only needs to sample in the first half of the symbol time. Accordingly, sampling may be stopped and power saved for some finite time.

Figure 2:
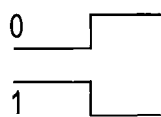
FIG. 2 illustrates Manchester symbols for 0 and 1 in accordance with an exemplary embodiment of the present invention.

In accordance with an exemplary embodiment of the invention, Manchester coding is utilized. In Manchester coding, the transmit symbols are split into two parts, one having a 0 value and the other having a 1 value. For example, if the first half of the symbol is a 0 and the second half is a 1, then this is a 0 symbol, whereas if the first half of the symbol is a 1 and the second half of the symbol is a 0, then this is a 1 signal. Thus each transmittal symbol has a center-of-symbol transition or edge and these transitions may be detected with each symbol regardless of the sequence of data bits or symbols being transmitted. FIG. 2 illustrates the Manchester symbols for 0 and 1 as utilized in conjunction with the present invention.

As is known in the relevant art, a receiver may oversample the transmitted data symbols by a factor of eight (8) or sixteen (16) and detect the center of the symbol transition. By counting the number of sample intervals between successive symbols, the receiver may adjust its sample points to synchronize to the transmitted data stream. Another advantage of Manchester coding is that each symbol has an average value of one-half, thereby allowing any code word to be utilized while maintaining an average value of one-half for the transmitted data. This simplifies the adjustment or tracking of a threshold value for data detection at a comparator in the receiver. Manchester coding requires that at least four samples per symbol are utilized and the data rate for a given bandwidth is half of that with NRZ coding, which may be a disadvantage.

Manchester data decoding may be implemented at the receiver utilizing the following process. The following exemplary process represents a method of sampling and maintaining alignment with a stream of Manchester coded symbols. In the exemplary process, it is assumed that the receiver utilizes 8× oversampling, providing eight (8) samples per symbol or four (4) samples per half symbol. In a first step of the exemplary process, the signal is sampled until a data transition or edge is found. In a second step of the exemplary process, a determination has to be made as to whether the incoming signal may be aligned with or in phase with the clock that is utilized to determine when samples are taken. At first, successive sample values are examined to find or look for a transition from a 1 to a 0 or from a 0 to a 1. If a transition is found, it is assumed that this may be a mid-symbol transition. If it is in fact a mid-symbol transition, then no additional samples are collected for a specific time period. Essentially, one may skip ahead from the mid-symbol transition to the sample time that should be in the middle of the next "first half symbol time." This is a ¾ of a symbol later, or six (6) samples later at 8× oversampling. In a third step of the exemplary process, the first two steps are repeated until enough time has elapsed to ensure that the receiver is past the longest run of consecutive 1's allowed. At this point, the data transitions are guaranteed to be aligned with 0 bits, wherein a. 00→_-_-_ . . . these are "false" edges between symbols;
b. 01→_--_ . . . these are mid-symbol transition edges;
c. 10→-_- . . . these are mid-symbol transition edges; and
d. 11→-_-_ . . . these are "false" edges between symbols.

In a fourth step of the exemplary process, the signal is sampled until a data transition or edge is found. In a fifth step of the exemplary process, the methodology of the second step is repeated to once again make a determination as to whether the incoming signal may be aligned with or in phase with the clock that is utilized to determine when samples are taken. In a sixth and final step of the exemplary process, the fourth and fifth steps are repeated until the desired number of samples has been collected.

Figure 3:
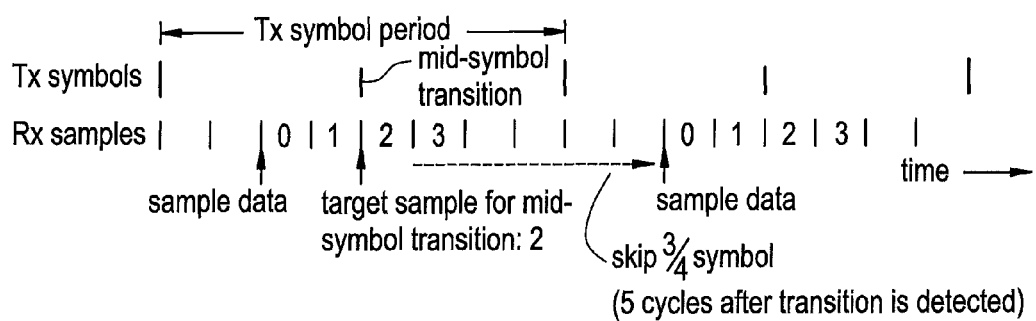
FIG. 3 illustrates Manchester sampling, nominal sampling rate and points in accordance with an exemplary embodiment of the present invention.

The exemplary process set forth below represents a method of detecting and decoding an entire message made up of many symbols strung together. The Manchester symbol decoding of the exemplary process set forth above takes place in each step of the exemplary process set forth below. The exemplary process is implemented at the receiver. In a first step of the exemplary process, the receiver starts in the IDLE state and waits until enabled. When enabled, the receiver goes to the INITIAL state. In a second step of the exemplary process, the receiver enters the INITIAL state. In the INITIAL state, the receiver takes or captures sufficient samples to ensure that sampling is aligned with the Manchester data stream (the first three steps of the above described exemplary process). This may require additional settling time for analog circuits or comparison thresholds. The receiver then goes to the next state; namely, the SYNCHRONIZATION SEARCH state. In the next step, the receiver enters the SYNCHRONIZATION SEARCH state. If synchronization is not found after LS+LA+LC+1 symbols, then the receiver exits to the END state. If, however, synchronization is found, the receiver goes to the ADDRESS SEARCH state. In a fourth step of the exemplary process, the receiver enters the ADDRESS SEARCH state. If a valid address is not found, then the receiver exits to the END state. If, however, a valid address is found, then the receiver goes to the COMMAND SEARCH state. In a fifth step of the exemplary process, the receiver enters the COMMAND SEARCH state. If a valid command is found, a flag is set to alert the system which command was found and the receiver goes to the END state. In the sixth and final step of the exemplary process, the receiver enters the END state. Once the receiver is disabled, the state machine of the receiver enters the IDLE state, waiting to be re-enabled and the process is repeated. FIG. 3 illustrates the expected sample points for data and the rising or mid-symbol edge.

Figure 4:
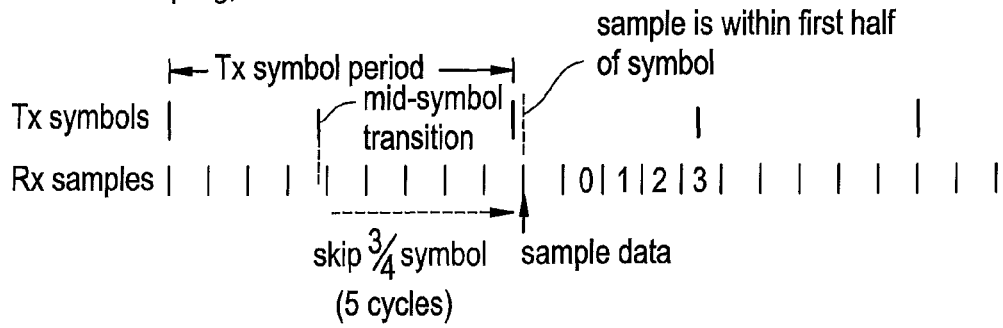
FIG. 4 illustrates Manchester sampling worst case points for a receiver that is fifteen percent fast relative to the transmitter.
Figure 5:
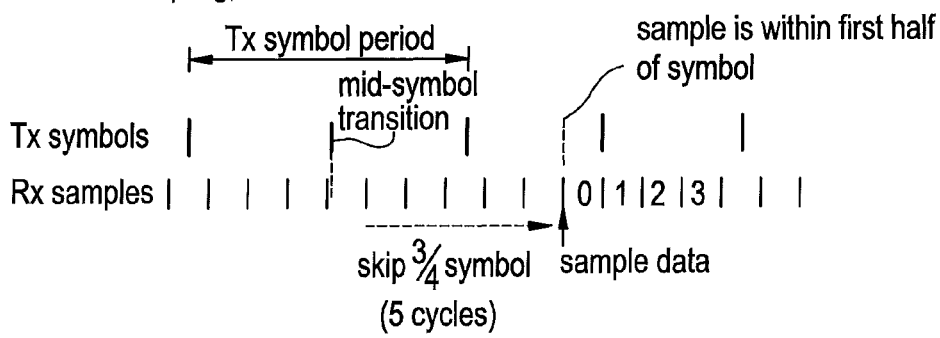
FIG. 5 illustrates Manchester sampling worst case points for a receiver that is fifteen percent slow relative to the transmitter.

With Manchester coding, because the receiver sample time reference is effectively updated at each mid-symbol transition, it is also possible to implement the receiver without frequency acquisition as long as the frequency difference between the transmitter and the receiver is less than about +/− fifteen (15) percent. This allows for simplified receiver time bases such as RC oscillators, thereby providing for a much lower or decreased complexity, volume and current drain than ceramic resonator or quartz crystal-based oscillators. The resulting worst case sample points for these cases are illustrated in FIGS. 4 and 5. In alternate exemplary embodiments of the invention, the frequency of the receiver clock or time base may be adjusted to align to the transmit symbol rate.

Frequency alignment and Manchester decoding may be implemented utilizing the following exemplary process. In a first step of the exemplary process, a signal is sampled until a data transition or edge is found. In a second step of the exemplary process, a determination has to be made as to whether the incoming signal may be aligned with or in phase with the clock that is utilized to determine when samples are taken. At first, successive sample values are examined to find or look for a transition from a 1 to a 0 or from a 0 to a 1. If a transition is found, it is assumed that this may be a mid-symbol transition. If it is in fact a mid-symbol transition, then no additional samples are collected for a specific time period. In other words, one can skip ahead from the mid-symbol transition to the sample time that should be in the middle of the next "first half symbol time." This is a ¾ of a symbol later, or six (6) samples later at 8× oversampling. In a third step of the exemplary process, the first two steps are repeated twice to ensure that data symbols are being detected. In a fourth step of the exemplary process, the sample count is set to zero and sampling is performed until a data transition or edge is found. If the sample count is lower than the target transition sample count, the receiver sample clock frequency is increased. If the sample count is greater than the target transition sample count, the receiver sample clock frequency is decreased. In a fifth step of the exemplary process, the methodology of the second step is repeated. In a sixth step of the exemplary process, the fourth and fifth steps are repeated until enough time has elapsed to ensure that the receiver is past the longest run of consecutive 1's allowed. In a seventh step of the exemplary process, the sample count is set to zero and the signal is sampled until a data transition or edge is found. Optionally, if the sample count is lower than the target transition sample count, the receiver sample clock frequency may be increased, and if the sample count is greater than the target transition sample count, the receiver sample clock frequency may be decreased. In an eighth step of the exemplary process, the methodology of the second step is repeated. In a ninth and final step of the exemplary process, the seventh and eighth steps are repeated until the desired number of samples have been collected.

It is important to note that as with all protocols, the use of longer synchronization words and address lengths will increase the threshold of successful detection and thereby decrease the falsing rate.

Figure 6:
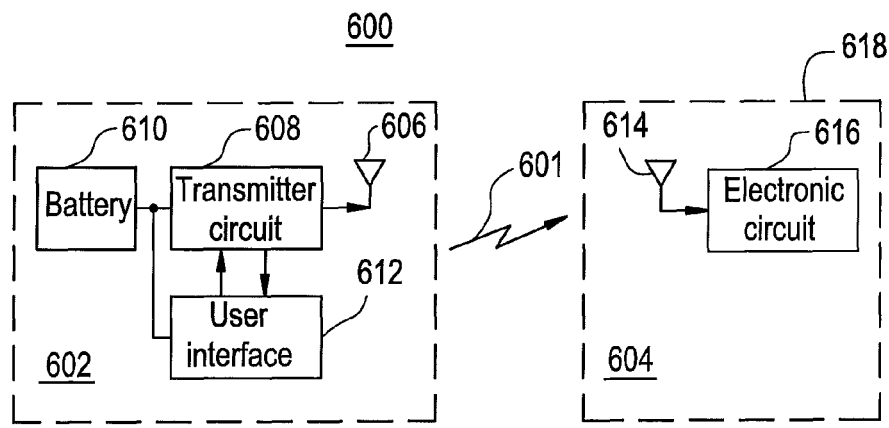
FIG. 6 is a block diagram representation of an exemplary communication system in accordance with the present invention.

As set forth above, the communication protocol in accordance with the present invention may be utilized with any type of communication system, but it is particularly advantageous where power and size are of concern. One such system is a powered contact lens that includes a communication system. Referring now to FIG. 6, there is illustrated an exemplary transmitter and an exemplary optical lens assembly comprising a receiver. As illustrated, the overall system 600 comprises a control transmitter 602 and an optical lens assembly 604. The control transmitter 602 may comprise an antenna 606, a transmitter circuit 608, a battery 610 and a user interface 612. The user interface 612 may comprise any suitable interface and it may be an optional component of the system. The antenna 606 may also comprise any suitable device. The battery 610 may also comprise any suitable device, including rechargeable batteries, non-rechargeable batteries, one or more capacitors and a power supply that works with an AC adapter. The user interface 612 is coupled to the transmitter circuit 608 and may provide buttons or similar means for a user to control and/or observe the status of the transmitter circuit 608. In other words, the user interface 612 may comprise any suitable means through which a user or operator may command and communicate with the transmitter circuit 608 such as buttons, touch screen displays or any other known means. The transmitter circuit 608 generates and provides an electrical transmit signal to the antenna 606 in order to broadcast a transmit electromagnetic signal 601. The transmit electromagnetic signal 601 may be based on control information provided by the user/operator and/or may be based on an internal state of the transmitter 602. The optical lens assembly 604 may also comprise an antenna 614, an electronic circuit 616, and a lens structure 618 with which the antenna 614 and the electronic circuit 616 are incorporated. Although not illustrated, both the transmitter and the receiver comprise a suitable power source.

The present invention is directed to a wireless protocol for a communication system that may be utilized for communication between a transmitter and a receiver, wherein the receiver is incorporated into an ophthalmic lens. The wireless protocol may be utilized in conjunction with any type of communication channel, including wireless radio frequency and infrared technology. The type of receiver depends on the particular communication channel selected, but may be incorporated into the ophthalmic lens in any suitable manner as is known in the relevant art. The type of transmitter also depends on the communication channel and may be incorporated into any suitable device such as a handheld fob, a smart phone, a watch, a ring or a base station such as a disinfection case for the ophthalmic lenses.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. A method for wireless data communication, the method comprising the steps of:
    assembling a message frame, the message frame including a synchronization word, an address word and a data word;
    repeatedly transmitting the message frame from a wireless transmitter for a minimum transmission duration;
    at a receiver, periodically searching for a predetermined synchronization word in the transmitted message frame, the duration of each synchronization search being at least as long as the length of the message frame plus the length of one synchronization word minus one symbol;
    at the receiver, determining if a transmitted message frame includes a synchronization word that corresponds to the predetermined synchronization word; and
    at the receiver, decoding the transmitted message frame only if the predetermined synchronization word is found;
    wherein the receiver is incorporated into an ophthalmic lens comprising an antenna, an electronic circuit, and a lens structure.

2. The method for wireless data communication according to claim 1, wherein the step of assembling a message frame comprises removing address words which in combination with the synchronization word, the address word and the data word have a set minimum correlation to a synchronization word.

3. The method for wireless data communication according to claim 2, wherein the step of assembling a message frame further comprises generating the synchronization word utilizing a Gold code sequence.

4. The method for wireless data communication according to claim 2, wherein the message frame is encoded utilizing Manchester coding for each bit in the message frame.

5. The method for wireless data communication according to claim 1, wherein the step of periodically searching for a predetermined synchronization word in the transmitted message frame has a period of less than the minimum transmission duration.

6. The method for wireless data communication according to claim 1, wherein the address word corresponds to a device address.

7. The method for wireless data communication according to claim 1, wherein the address word corresponds to a register address.

8. The method for wireless data communication according to claim 1, further comprises the step of adding a parity bit at the end of a message frame.

9. A method for wireless data communication, the method comprising the steps of:
- assembling a message frame, the message frame including a synchronization word and a data word;
- repeatedly transmitting the message frame from a wireless transmitter for a minimum transmission duration;
- at a receiver, periodically searching for a predetermined synchronization word in the transmitted message frame, the duration of each synchronization search being at least as long as the length of the message frame plus the length of one synchronization word minus one symbol;
- at the receiver, determining if a transmitted message frame includes a synchronization word that corresponds to the predetermined synchronization word; and
- at the receiver, decoding the transmitted message frame only if the predetermined synchronization word is found;
- wherein the receiver is incorporated into an ophthalmic lens comprising an antenna, an electronic circuit, and a lens structure.

10. A wireless communication system comprising:
- a transmitter, including transmitter circuitry and encoding circuitry, the encoding circuitry being configured to assemble a message frame having at least a synchronization word and a data word, and the transmitter being configured to repeatedly transmit the message frame for a minimum transmission duration;
- a transmission channel; and
- a receiver, including receiver circuitry and decoding circuitry, the decoding circuitry being configured for periodically searching for a predetermined synchronization word in the transmitted message frame, the duration of each synchronization search being at least as long as the length of the message frame plus the length of the synchronization word minus one symbol, wherein the period of searching for a predetermined synchronization word in the transmitted message frame is less than the minimum transmission duration;
- wherein the receiver is incorporated into an ophthalmic lens comprising an antenna, an electronic circuit, and a lens structure.

11. The wireless communication system according to claim 10, wherein the transmitter circuitry is configured to specifically transmit a message over the transmission channel.

12. The wireless communication system according to claim 11, wherein the receiver circuitry is configured to specifically receive a message over the transmission channel.

13. The wireless communication system according to claim 10, wherein the transmitter may be incorporated in a hand held device.

14. The wireless communication system according to claim 10, wherein the receiver may be incorporated in a hand held device.

15. The wireless communication system according to claim 10, wherein the receiver may be incorporated in a medical device.

16. The wireless communication system according to claim 10, wherein the receiver may be incorporated in an implantable medical device.

17. The wireless communication system according to claim 10, wherein the receiver may be incorporated in an ophthalmic lens.

18. The wireless communication system according to claim 10, wherein the transmission channel comprises a high frequency electromagnetic propagation channel.

19. The wireless communication system according to claim 10, wherein the transmission channel comprises a low frequency electromagnetic coupling.

20. The wireless communication system according to claim 10, wherein the transmission channel comprises a visible light electromagnetic propagation channel.

21. The wireless communication system according to claim 10, wherein the transmission channel comprises an infrared light electromagnetic propagation channel.

22. The wireless communication system according to claim 10, wherein the transmitter is configured to modulate and transmit a carrier signal over the transmission channel.

23. The wireless communication system according to claim 22, wherein the transmitter modulates at least one of phase, frequency or amplitude of the carrier signal.

24. A wireless receiver comprising:
- decoding circuitry, the decoding circuitry being configured for periodically searching for a predetermined synchronization word in a transmitted message frame, the duration of each synchronization search being at least as long as the length of the message frame plus the length of the synchronization word minus one symbol, wherein the period of searching for a predetermined synchronization word in the transmitted message frame is less than the minimum transmission duration; and
- receiving circuitry for receiving a transmitted message from a transmission channel;
- wherein the receiver is incorporated into an ophthalmic lens comprising an antenna, an electronic circuit, and a lens structure.

* * * * *